(12) United States Patent
Kottke et al.

(10) Patent No.: US 11,661,900 B2
(45) Date of Patent: May 30, 2023

(54) METHOD FOR MONITORING A FUEL SUPPLY SYSTEM OF AN INTERNAL COMBUSTION ENGINE AND INTERNAL COMBUSTION ENGINE FOR CARRYING OUT SUCH A METHOD

(71) Applicant: Rolls-Royce Solutions GmbH, Friedrichshafen (DE)

(72) Inventors: Thomas Kottke, Ehningen (DE); Robby Auer, Tettnang (DE); Thilo Kreeb, Ravensburg (DE); Martin Hähnlen, Daisendorf (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 0 days.

(21) Appl. No.: 17/587,803

(22) Filed: Jan. 28, 2022

(65) Prior Publication Data
US 2022/0145821 A1 May 12, 2022

Related U.S. Application Data

(63) Continuation of application No. PCT/EP2020/071142, filed on Jul. 27, 2020.

(30) Foreign Application Priority Data

Jul. 30, 2019 (DE) ...................... 10 2019 211 372.9

(51) Int. Cl.
*F02D 41/22* (2006.01)
*F02M 37/40* (2019.01)

(52) U.S. Cl.
CPC .............. *F02D 41/22* (2013.01); *F02M 37/40* (2019.01); *F02D 2041/224* (2013.01);
(Continued)

(58) Field of Classification Search
CPC .............. F02D 41/22; F02D 2041/224; F02D 2200/0602; F02D 2200/0606;
(Continued)

(56) References Cited

U.S. PATENT DOCUMENTS

| 6,520,162 B1 * | 2/2003 | Schueler ................ F02M 37/40 |
| | | 210/90 |
| 7,856,961 B2 | 12/2010 | Doelker et al. |
| | | (Continued) |

FOREIGN PATENT DOCUMENTS

| DE | 199 16 994 C1 | 10/2000 | |
| GB | 2333244 A * | 7/1999 | ........... B01D 35/143 |
| JP | 2006-316771 A | 11/2006 | |

OTHER PUBLICATIONS

International Search Report and Written Opinion dated Nov. 13, 2020 for International Application No. PCT/EP2020/071142 (11 pages).

*Primary Examiner* — George C Jin
(74) *Attorney, Agent, or Firm* — Taylor IP, P.C.

(57) ABSTRACT

A method for monitoring a fuel supply system in an internal combustion engine includes the steps of: recording a first pressure value in the fuel supply system in a region of the fuel supply system associated with a pre-filter and upstream of a low pressure pump; recording a second pressure value in the fuel supply system downstream of the low pressure pump in a region of the fuel supply system associated with a primary filter; monitoring the first pressure value and the second pressure value for an error state of the fuel supply system; and recognizing the error state only if the error state is plausible on a basis of both the first pressure value and the second pressure value.

13 Claims, 2 Drawing Sheets

(52) U.S. Cl.
CPC ........ *F02D 2200/0602* (2013.01); *F02D 2200/0606* (2013.01); *F02D 2200/10* (2013.01)

(58) Field of Classification Search
CPC .... F02D 2200/10; F02M 37/40; G01M 15/09; G01M 3/26
See application file for complete search history.

(56) References Cited

U.S. PATENT DOCUMENTS

| | | | | |
|---|---|---|---|---|
| 2002/0043253 | A1* | 4/2002 | Begley | F02D 41/3082 123/457 |
| 2010/0108029 | A1* | 5/2010 | Rollinger | F02D 41/22 701/29.5 |
| 2012/0073545 | A1* | 3/2012 | Worthington | F02D 41/3082 123/497 |
| 2013/0013175 | A1* | 1/2013 | Nistler | F02D 41/22 701/112 |
| 2019/0338719 | A1 | 11/2019 | Renner | |
| 2022/0145821 | A1* | 5/2022 | Kottke | F02D 41/22 |

* cited by examiner

METHOD FOR MONITORING A FUEL SUPPLY SYSTEM OF AN INTERNAL COMBUSTION ENGINE AND INTERNAL COMBUSTION ENGINE FOR CARRYING OUT SUCH A METHOD

CROSS REFERENCE TO RELATED APPLICATIONS

This is a continuation of PCT application no. PCT/EP2020/071142, entitled "METHOD FOR MONITORING A FUEL SUPPLY SYSTEM OF AN INTERNAL COMBUSTION ENGINE AND INTERNAL COMBUSTION ENGINE FOR CARRYING OUT SUCH A METHOD", filed Jul. 27, 2020, which is incorporated herein by reference. PCT application no. PCT/EP2020/071142 claims priority to German patent application No. 10 2019 211 372.9, filed Jul. 30, 2019, which is incorporated herein by reference.

BACKGROUND OF THE INVENTION

1. Field of the Invention

The invention relates to a method for monitoring a fuel supply system of an internal combustion engine, and further relates to an internal combustion engine having a fuel supply system to carry out such a method.

2. Description of the Related Art

Such a fuel supply system includes a number of components, in particular a pre-filter located upstream from a low pressure pump, and a primary filter which is arranged fluidically between the low pressure pump and the high pressure pump. Error states in such a fuel supply system are generally difficult to detect. Therefore, rigid maintenance intervals, especially replacement intervals—in particular for the low pressure filter and the high pressure filter—are provided, which however for safety reasons may then be selected systematically shorter than necessary, so that functioning filters are generally replaced. If in contrast, one relies on sensor-based error detection, a problem of false-positive error diagnosis may occur for example because a change in the fuel viscosity—whether due to a change of fuel or due to a temperature change—in a sensor feedback represents a filter breakdown. Reliable and accurate recognition of slowly developing aging phenomena as well as rapidly occurring failures are also proven difficult.

What is needed in the art is a method for monitoring a fuel supply system of an internal combustion engine, as well as an internal combustion engine having a fuel supply system for carrying out such a method, wherein the aforementioned disadvantages will not occur.

SUMMARY OF THE INVENTION

The present invention provides a method for monitoring a fuel supply system for an internal combustion engine, wherein a first pressure value is detected in the fuel supply system in the region of a pre-filter, in particular downstream of the pre-filter and upstream of a low pressure pump. A second pressure value is detected in the fuel supply system downstream from the low pressure pump in the region of the primary filter. The first pressure value and the second pressure value are monitored for an error state in the fuel supply system. Within the scope of the method an error state is detected only if the error state is plausible based on both pressure values. The inclusion of both pressure values in the evaluation of an error facilitates a significant reduction of the problem of a false-positive error recognition. In particular, by way of the plausibility check of both pressure values it is possible to distinguish between filter defects, for example, filter breakdowns on the one hand, and viscosity changes in the fuel on the other hand. This in turn allows for improved automated monitoring of the fuel supply system, eliminating the need for rigid maintenance intervals that are systematically too short. In particular, based on the inclusion of both pressure values in the detection of an error state, slowly developing aging phenomena as well as rapidly occurring failures can be monitored and rapidly occurring failures can be recognized in a timely fashion.

A fuel supply system is to be understood in particular to be a system which is designed to supply fuel—in particular from a storage tank, such as a fuel tank—for combustion to an internal combustion engine, wherein the fuel supply system is designed in particular to bring the fuel, starting from a low pressure level in the storage tank, in particular from ambient pressure to a high pressure for introducing it into the combustion chamber of the internal combustion engine, in particular for direct fuel injection.

Pressure value is herein understood in particular to be a measurable physical value having the uniformity of a pressure. The pressure value can herein be a single value or a chronological value progression. The pressure value can in particular be based on a local measurement, or a differential value, in particular on a difference between measurements from two different locations. The pressure value can be expressed as an absolute pressure or as a relative pressure, in particular overpressure. Optionally, the pressure value is stated as a relative pressure, in particular an overpressure.

The fact that the first pressure value is recorded in the region of the pre-filter means in particular that the first pressure value is recorded directly upstream and/or directly downstream of the pre-filter, wherein in particular no additional hydraulic element is arranged between the location of a pressure sensor for detection of the first pressure value and the pre-filter. The first pressure value is optionally recorded directly downstream of the pre-filter.

The fact that the second pressure value is recorded in the region of the primary filter means in particular that the second pressure value is recorded directly upstream and/or directly downstream of the primary filter, wherein in particular no additional hydraulic element is arranged between the location of a pressure sensor for recording the second pressure value and the primary filter.

The second pressure value is recorded optionally downstream of the low pressure pump and upstream of a high pressure pump. In particular, the primary filter is optionally arranged fluidically between the low pressure pump and the high pressure pump, in particular upstream of a suction throttle that is allocated to the high pressure pump.

The fact that the error state is plausible based on both pressure values means in particular, that based on an evaluation or consideration of both pressure values—that is the first pressure value and the second pressure values—the error state exists with a certain probability which is optionally greater than a predetermined threshold probability, and/or that based on both pressure values no other, in particular no other probable cause for the observed behavior of both pressure values can be detected.

According to a further development of the present invention it is provided that, if one of the pressure values selected from the first pressure value and the second pressure value, indicates an error state in the fuel supply system, the error state is verified on the basis of the other pressure value, selected from the second pressure value and the first pressure value. The error state is thereby only accepted if the verification returns a positive result; in other words, if the verification based on the other pressure value confirms the error state or at least does not exclude or regard the latter unlikely. The fact that the error state is only accepted in this case means in particular, that the error state is only recognized under these circumstances. The fact that the verification returns a positive result moreover means in particular, that the verification based on the other pressure value confirms the error state, in particular in the sense that it does not suggest another more plausible, in particular a more probable cause or explanation for the behavior of the one pressure value.

In this manner, false-positive detection of error states can be avoided.

According to a further development of the invention it is provided that an error state is detected only, if the error state can be assigned clearly to one of the pressure values, selected from the first pressure value and the second pressure value. This is based on the consideration that if the error state can be assigned to both pressure values, it is more likely that there is no error in a single component, for example the pre-filter or the primary filter, but rather a common, in particular non-error, cause for the behavior of the two pressure values, for example a change in the viscosity of the fuel, either due to a fuel change or due to a change in temperature. This is ultimately more probable than two independent components of the fuel supply system displaying an error state at the same time, for example the pre-filter and the primary filter simultaneously displaying a filter breakdown. Thus, false-positive error recognition can be reliably avoided.

According to a further development of the invention it is provided that as the first pressure value and as the second pressure value respectively a chronological pressure value progression is recorded. The chronological pressure value progression is optionally monitored for changes. This proves to be particularly advantageous with regard to monitoring the fuel supply system as error states manifest themselves in particular in changes of the chronological behavior of pressure values. For example, the pressure dropping above a filter changes slowly and continuously due to unavoidable contamination of the filter, wherein the latter becomes increasingly clogged. A filter breakdown or sudden clogging of the filter caused by a failure manifests itself by an abrupt change of the chronological pressure value progression. In particular, the chronological pressure value progression is monitored optionally for a change in a time derivative, in particular an increase, curvature or a greater derivative.

The pressure value progression is optionally also monitored in regard to the pressure threshold values, in particular to an upper pressure limit and a lower pressure limit which may not be exceeded or fallen below. If such a threshold is exceeded or undercut a warning is optionally issued. Optionally, additional safety limits are defined, for example an upper error limit which is higher than the upper pressure limit, and/or a lower error limit which is lower than the lower pressure limit, wherein an error message is issued if the pressure value progression or the pressure value exceeds such an error limit.

Moreover, a tolerance range is optionally provided around an expected, in particular precalculated chronological development of the pressure value progression, wherein a warning is issued, if the pressure value progression leaves said tolerance range.

According to a further development of the present invention it is provided that for the first pressure value a local pressure, in particular a local pressure progression is detected, in particular by a single pressure sensor. In particular, a single pressure sensor which detects the first pressure value is optionally arranged downstream from the pre-filter and upstream from the low pressure pump. For the pre-filter, a single local pressure detection is sufficient, wherein an appropriate design having only one pressure sensor is cost effective.

The second pressure value is optionally detected as a differential pressure, in particular as a differential pressure value progression, in particular as a differential pressure dropping above the primary filter. For this purpose, two pressure sensors are optionally provided, wherein a first pressure sensor is arranged upstream from the primary filter and a second pressure sensor is arranged downstream from the primary filter, so that by way of a difference between measured values by the first pressure sensor and the second pressure sensor respectively, a differential pressure can be determined, which drops above the primary filter. Thus, the primary filter can be monitored in an especially exact and meaningful manner.

According to a further development of the present invention it is provided that a fuel temperature value is captured, optionally as a chronological temperature progression, wherein the error state is only detected if the error state is also plausible based on the fuel temperature value. In particular, temperature changes can thus be ruled out as causes for false-positive error recognitions.

Moreover, a temperature change captured on the basis of the fuel temperature value is optionally entered into the determination of the tolerance range for the pressure value progression, wherein a tolerance adjustment to the respective fuel temperature is meaningful, since the pressure value progression clearly depends on the current fuel temperature.

Alternatively or additionally, a current load point of the internal combustion engine is optionally recorded, wherein the error state is recognized only if the error state is plausible also on the basis of the current load point of the internal combustion engine. In this respect it has turned out that the pressure values are in particular also load point dependent, so that a corresponding inclusion of the current load point of the internal combustion engine is again advantageous in order to avoid a false-positive error recognition.

According to a further development of the present invention it is provided that, if one of the pressure values selected from the first pressure value and the second pressure value indicates an error state of the fuel supply system, the error state is checked for plausibility on the basis of a further chronological development of the at least one pressure value—in particular the pressure value that suggests the error state. In this way, the further chronological development of the pressure value can be used to determine, whether an error state actually exists. If, for example a change in the viscosity of the fuel occurs, which initially manifests itself like a filter breakdown, the chronological development of the pressure value returns—after a settling time—to a normal development due to aging/contamination effects. This, in turn allows a determination that no filter breakdown occurred. It can thus be used in particular for plausibility checks that in the future a particular chronological development is reversed, since the viscosity has adjusted to a particular value and now the mechanisms of pollution and aging are taking effect again.

According to a further development of the present invention it is provided that on the basis of the first pressure value and the second pressure value the pre-filter and the primary filter are monitored for an error state. The already discussed advantages of the method result, especially in connection with error monitoring for these filters.

According to a further development of the present invention it is provided that a filter breakdown of a particular filter, selected from the pre-filter and the primary filter is detected, if only the pressure value assigned to the particular filter, selected from the first pressure value and the second pressure value indicates the filter breakdown. On the other hand, a filter breakdown is not detected, if both pressure values, that is the first pressure value and the second pressure value, each indicate a filter breakdown. This is based on the idea that it is unlikely that both filters, namely the pre-filter and the primary filter experience a filter breakdown at the same time. Therefore, if the two pressure values indicate at the same time that a filter breakdown occurred in the filter assigned to them respectively, this suggests, with a higher probability than a simultaneous breakdown of both filters, that a common other cause is responsible for the respective values, in particular the changes in the pressure values. This may in particular be a change in viscosity of the fuel, wherein especially a lowering of the viscosity results in the fuel being able to penetrate the filters more easily with lower flow resistance, leading to a change in the pressure values, which may be misinterpreted as a filter breakdown. Such a change in viscosity may occur for example as a result of a change in the fuel that is used and/or as a result of a temperature change, in particular a temperature increase.

If the first pressure value is for example a pressure value progression which is measured downstream from the pre-filter, then the first pressure value usually indicates a negative rise within a particular tolerance field if there is no indication of an error state, since the pre-filter clogs over time, meaning, it ages due to contamination, wherein with consistent performance of the low pressure pump a fuel volume flow that decreases over time is pumped through the pre-filter. Thus the pressure downstream of the pre-filter decreases over time. If then a breakdown occurs in the pre-filter the increase in the first pressure value changes suddenly due to the filter breakdown, wherein it assumes a positive indicator since now more fuel can be pumped through the pre-filter. However, the same behavior can also result from a viscosity reduction in the fuel.

If, for example, the second pressure value is recorded as a differential pressure value progression of the differential pressure dropping above the primary filter, this will show a positive increase during normal operation, since the differential pressure rises due to continuous age related contamination of the primary filter. A breakdown on the primary filter leads to a sudden change in the increase, which then assumes a negative indicator as the differential pressure above the primary filter drops due to the breakdown. The same behavior occurs in the second pressure value, however due to a change of viscosity in the fuel. If the indicator of the increase of the pressure variable assigned to both the pre-filter and the primary filter changes at the same time, this indicates a change in the viscosity of the fuel, since—as already explained—a simultaneous breakdown at both filters is unlikely. Likewise, in the future the indicators will change again into the original state, when the fuels with the different viscosities have mixed, resulting again in an increase of the pressures due to the contamination of the filter. This may be used advantageously in the plausibility check of the data. If, on the other hand only one of the pressure values changes the indicator of its increase while the indicator of the increase of the other pressure value remains constant, it can be concluded that a breakdown has occurred in the affected filter whose assigned pressure value shows the change in the indicator of the increase.

In general, a constellation, in which only one of the pressure values suggests an error state, while the other pressure value does not suggest this conclusion, virtually rules out a common cause for the corresponding behavior of the pressure values. It can then be logically concluded that there is a local cause in the region where the respective pressure value is recorded, which in turn indicates the error state.

The fact that only the pressure value assigned to a particular filter leads to the conclusion of the filter breakdown means, in particular, that the pressure value assigned to the other filter does not suggest a filter breakdown.

A pressure value assigned to a particular filter is understood to be a pressure value that is recorded locally in the immediate vicinity of the respective filter, so that it is directly affected by the behavior of the respective filter and thus permits an immediate readout of said respective filter.

In particular, the first pressure value is assigned to the pre-filter since it is detected in its region, in particular immediately downstream of the pre-filter, in particular fluidically arranged between the pre-filter and the low pressure pump. Accordingly, the second pressure value is assigned to the primary filter, as it is detected in the region of the primary filter.

According to a further embodiment of the present invention, it is provided that the fuel supply system is used to supply a plurality of internal combustion engines, wherein the error state is checked for plausibility over at least two internal combustion engines of the plurality of internal combustion engines. This allows for additional security in error detection, in particular in avoiding the false-positive recognition of error states. In particular, each internal combustion engine has optionally assigned to it a partial fuel supply system with its own pre-filter and its own primary filter, wherein accordingly for each internal combustion engine respectively a first pressure value and a second pressure value are detected. The different internal combustion engines are herein supplied with fuel by the various partial fuel supply systems, optionally from a common storage tank. Along the same lines of the considerations explained above, it follows in particular that an error state, in particular a filter breakdown, is only actually present with a high degree of probability if the same error state is not simultaneously detected on a large number of internal combustion engines. If, on the other hand, the same error state, for example a filter breakdown is detected simultaneously on a plurality of internal combustion engines, in particular for both filters, namely the respective primary filter and the respective pre-filter, this suggests again with higher probability another common cause—beyond the presumed error state—that a plurality of components are in fact defective at the same time. In particular, a change in the viscosity in the fuel, whether it is due to a change of fuel or a temperature change, affects a plurality of internal combustion engines, in particular all internal combustion engines at the same time. On the other hand, an actually occurring error state, in particular a filter breakdown has, at least with a high level of probability only a local effect on the respective filter and thus on the pressure value assigned directly to said filter.

Such a fuel supply system for supplying a plurality of internal combustion engines is used in particular in a so-called multi-engine system. Such multi-engine systems are used optionally to drive rail vehicles, in particular rail engines, watercraft, in particular as ship or boat engines, in particular yacht or ferry engines. However, such a multi-engine system can also be provided for parallel operation of a plurality of generators for generating electric power. The use of multi-engine systems is by no means limited to the herein discussed applications.

According to a further development of the present invention it is provided that, based on the first pressure value and the second pressure value—in particular in addition to the previously discussed monitoring of the primary filter and the pre-filter—at least one additional component is monitored in regard to an error state, wherein the additional component is selected from a group consisting of: a low pressure pump, optionally including a pre-throttle for the low pressure pump; a control valve; suction throttle, in particular a suction throttle that is assigned to a high pressure pump for flow volume control; and a high pressure pump, in particular a lubricant supply for a high pressure pump. At least one of these components can additionally be monitored for an error state in an advantageous manner on the basis of the two pressure values.

Optionally, at least the low pressure pump, in particular including the pre-throttle, the suction throttle and the high pressure pump are designed as one pump unit, in particular arranged integrally with one another and jointly manageable, in particular designed to be installed in or removed from the fuel supply system.

The pre-throttle is designed optionally to limit a volume flow to the low pressure pump. This limitation depends in particular on the first pressure value and is designed for suction operation.

The control valve has optionally a volume flow-dependent pressure characteristic. In particular, the second pressure value is characteristic of the function of the control valve, the control valve optionally being arranged fluidically in a flow control line branching from a flow connection from the primary filter to the suction throttle and leading back to a point upstream of the low pressure pump, where it flows in particular into a flow connection between the pre-filter and the low pressure pump. In particular, if the pressure detected downstream from the primary filter exceeds a certain limit value, a defect of the control valve can be concluded, as it should activate if functioning correctly and should prevent an increase in pressure to above the limit value. If, on the other hand, the pressure detected downstream from the primary filter is too low, this indicates wear, in particular leakage or loss of spring force of the control valve, with excessive flow through the control valve. A pressure value that is too low downstream of the primary filter can also indicate a defect of the low pressure pump, which then can no longer provide the intended flow rate.

Lubrication of the high pressure pump occurs optionally via a lubrication path as a bypass flow path which branches off upstream from the suction throttle and leads to lubricating points of the high pressure pump. If this bypass-flow path is dirty, no lubrication takes place. This can be determined in particular by monitoring the pressure downstream from the primary filter. In particular, the pressure progression may herein have at most a predetermined maximum increase, since otherwise too little fuel flows via the bypass-flow path to the lubricating points.

The present invention also provides an internal combustion engine which has a fuel supply system for supplying fuel to at least one combustion chamber of the internal combustion engine. The fuel supply system has a storage tank, in particular a fuel tank which is fluidically connected via a pre-filter with a low pressure pump. The low pressure pump is fluidically connected via a primary filter with the high pressure pump. The internal combustion engine has a first pressure measuring device which is designed to capture a first pressure value in the fuel supply system in the region of the pre-filter, in particular downstream of the pre-filter and upstream of the low pressure pump. The internal combustion engine moreover has a second pressure measuring device which is designed to capture a second pressure value in the fuel supply system, downstream from the low pressure pump in the region of the primary filter. The internal combustion engine also has a control unit which is operatively connected with the first pressure measuring device on the one hand and with the second pressure measuring device on the other hand and is designed to monitor the first pressure value and the second pressure value for an error state in the fuel supply system; wherein however an error state is only detected if the error state is plausible based on both pressure values, in other words, based on the first pressure value and the second pressure value. The control unit is therefore designed in particular to check the plausibility on the basis of both pressure values. The control unit is designed in particular to carry out an inventive method or a method according to one of the previously described embodiments.

Advantages, which have already been explained in the context of the method occur in particular in connection with the internal combustion engine.

The first pressure measuring device is designed optionally as a single, first pressure sensor. The first pressure sensor is optionally arranged downstream from the pre-filter and upstream from the low pressure pump, in the fluidic connection between the pre-filter and the low pressure pump, in particular in the fuel line which fluidically connects the pre-filter with the low pressure pump.

The second pressure measuring device is optionally arranged upstream from the high pressure pump. The second pressure measuring device is optionally arranged in the fluidic connection between the low pressure pump and the high pressure pump, in particular in a fuel line which fluidically connects the low pressure pump with the high pressure pump. In particular, the first pressure measuring device is optionally arranged immediately upstream of the primary filter and/or immediately downstream of the primary filter.

In an optional arrangement, the second pressure measuring device has two second pressure sensors, wherein a first second pressure is arranged upstream of the primary filter, in particular directly upstream of the primary filter, and a second pressure sensor is arranged downstream of the primary filter, in particular directly downstream of the primary filter. The control unit is optionally operatively connected with both second pressure sensors. An optional embodiment is designed in particular to calculate from measured values of the two second pressure sensors a differential pressure that is dropping above the primary filter, as a second pressure value.

The internal combustion engine has optionally a temperature sensor that is arranged and designed to detect a fuel temperature value, wherein the control unit is operatively connected with the temperature sensor. The control unit is also optionally designed to check the plausibility of the error state also on the basis of the recorded fuel temperature value. The temperature sensor is optionally arranged in the fluidic connection between the pre-filter and the low pressure pump, or in the region of the storage tank, in particular on the storage tank.

The fuel supply system has optionally two low pressure pumps, which are arranged parallel to each other in the fluidic connection between the pre-filter and the primary filter.

To the high pressure pump is optionally assigned a suction throttle, which is arranged downstream of the high pressure pump in the fluidic connection between the primary filter and the high pressure pump, wherein the control unit is operatively connected with the suction throttle and is arranged to control the suction throttle to regulate a volume flow pumped by the high pressure pump.

Optionally, the fuel supply system has a control valve, which is arranged in a control line, which branches off from the fluidic connection between the primary filter and the high pressure pump, in particular between the primary filter and the suction throttle; and which, in an optional embodiment feeds in particular into the fluidic connection between the pre-filter and the at least one low pressure pump upstream of the at least one low pressure pump.

The fuel supply system has optionally two high pressure pumps arranged fluidically parallel to each other, wherein in particular the fluidic connection between the primary filter and the high pressure pumps branches to the two high pressure pumps. Each high pressure pump is optionally assigned its own suction throttle, arranged upstream of the respective high pressure pump.

The two high pressure pumps are each optionally used for the separate supply of fuel to an assigned, separate high pressure accumulator. The respective high pressure accumulator is optionally designed for a combustion chamber group, in particular a cylinder bank, an internal combustion engine having two combustion chamber groups, in particular cylinder banks, as a common high pressure accumulator, in particular as a so-called common rail, for the combustion chambers of the respective cylinder bank. Of course, with a larger number of combustion chamber groups, for example with three cylinder banks in the case of a W engine, it is also possible that three high pressure pumps—optionally with respectively assigned suction throttle—are provided. In particular, each high pressure accumulator of the combustion engine is optionally separately assigned a high pressure pump, in particular with assigned suction throttle, wherein all high pressure pumps—fluidically parallel to each other—are connected to the same primary filter.

Optionally, a control valve in a corresponding control line is assigned to each high pressure pump.

The fuel supply system optionally has a lubrication path for lubricating at least one high pressure pump, wherein the lubrication path downstream of the primary filter, optionally upstream of the suction throttle, branches off from the fluidic connection between the primary filter and the high pressure pump and flows into the high pressure pump, in particular at least to one lubrication point of the high pressure pump. Optionally, each high pressure pump is assigned such a lubrication path. The at least one high pressure pump is thus lubricated in particular by fuel.

The fuel supply system has optionally a leakage path from the at least one high pressure pump into the storage tank, which is in particular arranged to guide fuel used as lubricant from the high pressure pump back into the storage tank. In particular, each high pressure pump is optionally assigned such a leakage path.

The descriptions of the method on the one hand and the internal combustion engine on the other hand are optionally to be understood as complementary to each other. Features of the internal combustion engine, which have been explained explicitly or implicitly in connection with the method, are optionally individually or combined with each other features of an optional embodiment of the combustion engine. Process steps that have been explained explicitly or implicitly in connection with the internal combustion engine are optionally individually or combined with each other steps of an optional embodiment of the method. This is optionally characterized by at least one method step which is contingent upon at least one feature of an internal combustion engine according to the present invention or an embodiment of the internal combustion engine. The internal combustion engine is optionally characterized by at least one feature which is contingent upon at least one step of the method according to the present invention or an embodiment of the method.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
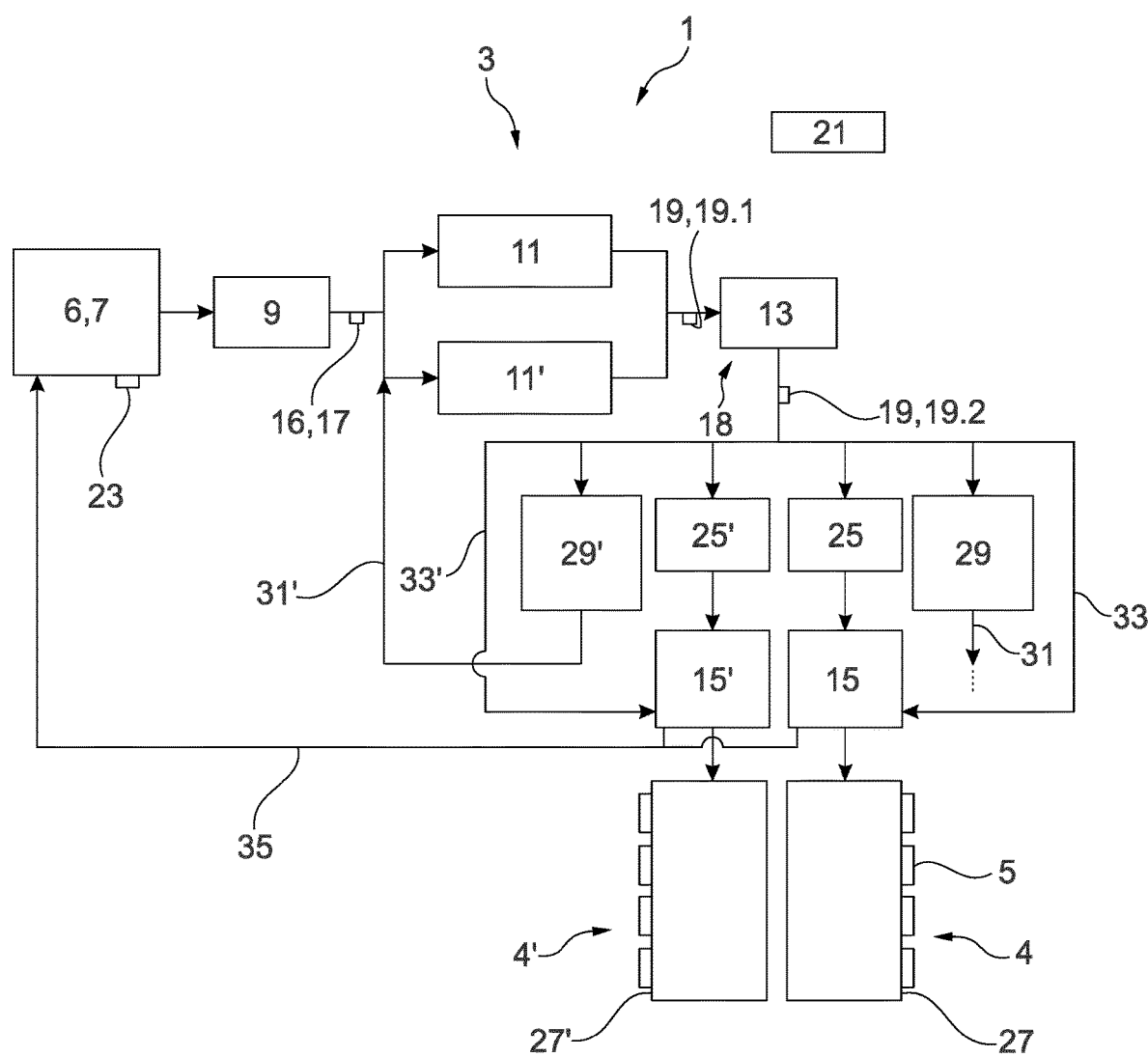
FIG. 1 is a schematic representation of an embodiment of an internal combustion engine with a fuel supply system.

FIG. 1 shows a schematic representation of an embodiment of an internal combustion engine 1, which has a fuel supply system 3 for supplying fuel to at least one combustion chamber 5 of internal combustion engine 1. In FIG. 1, eight combustion chambers 5 are shown schematically by way of example, of which only one is identified with the corresponding reference number for better clarity, wherein combustion chambers 5 are grouped to four each in two combustion chamber groups 4, 4', in particular cylinder banks. Internal combustion engine 1 is optionally designed as a V-engine.

Fuel supply system 3 has a storage tank 6, here in particular a fuel tank 7, which is connected fluidically via a pre-filter 9 to a low pressure pump 11. In the embodiment of internal combustion engine 1 shown here, two low pressure pumps 11, 11' are arranged parallel to each other downstream of pre-filter 9. Low pressure pump 11, here both parallel low pressure pumps 11, 11', is/are connected fluidically via a main filter 13 with a high pressure pump 15, here with two high pressure pumps 15, 15'. The flow path for the fuel downstream of pre-filter 9 first branches off to the two low pressure pumps 11, 11', in order to then merge downstream of low pressure pumps 11, 11', wherein primary filter 13 is assigned to low pressure pumps 11, 11' as the common primary filter 13. Downstream of main filter 13, the flow path then branches out again to the two high pressure pumps 15, 15', which are arranged fluidically parallel to each other.

Each of the high pressure pumps 15, 15' is assigned to a combustion chamber group 4, 4' of the two combustion chamber groups 4, 4'.

Internal combustion engine 1 has a first pressure measuring device 16, here a single first pressure sensor 17, which is arranged to detect a first pressure value in fuel supply system 3 in the region—particular downstream—of pre-filter 9, and upstream of low pressure pumps 11, 11'. Internal combustion engine 1 also has a second pressure measuring device 18, which is arranged to detect a second pressure value in fuel supply system 3 downstream of low pressure pumps 11, 11' in the area of primary filter 13. In the embodiment shown here, second pressure measuring device 18 has two second pressure sensors 19, namely a first second pressure sensor 19.1 upstream of primary filter 13, and a second, second pressure sensor 19.2 downstream of primary filter 13, wherein the second pressure value is captured as differential pressure, formed from the difference of the pressures detected by second pressure sensors 19.1, 19.2. The second pressure value is thus in particular a differential pressure dropping above primary filter 13.

Internal combustion engine 1 also has a control unit 21, which for the sake of better clarity because it is not explicitly presented here and which is operatively connected with first pressure sensor 17 on the one hand and with second pressure sensors 19.1, 19.2 on the other hand and is arranged to monitor the first pressure value and the second pressure value for an error state in fuel supply system 3, wherein an error state is only detected, if the error state is plausible based on both pressure values. This results in improved automated monitoring of fuel supply system 3, in particular monitoring slow aging phenomena and detecting rapid failures in a timely manner. In particular, a distinction can be made between the absence of the filters, for example filter breakdowns on the one hand, and viscosity changes in the fuel on the other. Not least because of this, the problem of false-positive error detections in such a fuel supply system 3 is reduced.

Control unit 21 is set up in particular that, when one of the pressure values selected from the first pressure value and the second pressure value indicates an error state in fuel supply system 3, the error state is checked on the basis of the other pressure value, selected from the second pressure value and the first pressure value, and that the error state is accepted only if the check returns a positive result.

Control unit 21 is designed in particular to detect an error state only if the error state can be clearly assigned to one of the pressure values, selected from the first pressure value and the second pressure value. Control unit 21 is in particular designed to capture a chronological pressure value curve as a first pressure value and as a second pressure value respectively, wherein optionally the pressure value curve is monitored for changes.

Combustion engine 1 has also optionally a temperature sensor 23, which is designed and arranged to detect a fuel temperature value. Control unit 21 is operatively connected with temperature sensor 23 and designed to check the plausibility of the error state, also on the basis of the recorded fuel temperature value. In the embodiment shown in FIG. 1 temperature sensor 23 is arranged on fuel tank 7. Alternatively or additionally, it is also possible that a temperature sensor, in particular temperature sensor 23, is arranged in the fluidic connection between pre-filter 9 and low pressure pumps 11, 11'.

Control unit 21 is optionally alternatively or additionally designed to detect a load point of internal combustion engine 1, whereby it only detects an error state if the error state is plausible also on the basis of the detected load point.

In particular, control unit 21 is designed to monitor pre-filter 9 and primary filter 13 for an error state on the basis of the first pressure value and the second pressure value.

Fuel supply system 3 can also be used to supply a plurality of internal combustion engines 1, wherein then the error state is optionally checked for plausibility via at least two internal combustion engines 1 of the majority of internal combustion engines 1.

High pressure pumps 15, 15' have optionally each assigned to them a suction throttle 25, 25', which is arranged upstream of respective high pressure pump 15, 15' in the fluidic connection between primary filter 13 and respective high pressure pump 15, 15'. Control unit 21 is optionally operatively connected with suction throttles 25, 25' and is designed to control suction throttles 25, 25' to regulate a volume flow conveyed by high pressure pumps 15, 15'.

High-pressure pumps 15, 15' each optionally serve to separately supply a respectively assigned, separate high pressure accumulator 27, 27' with fuel. High pressure accumulators 27, 27' are each assigned to one of the combustion chamber groups 4, 4'. In particular, high pressure accumulators 27, 27' are each designed as a common high pressure accumulator, in particular common rail, for combustion chambers 5 of the respectively assigned combustion chamber group 4, 4' or cylinder bank.

Each high-pressure pump 15, 15' is assigned a control valve 29, 29', which is arranged in a respective control line 31, 31'. Control lines 31, 31' each branch off from fluidic connections between primary filter 13 and respective high pressure pump 15, 15', in particular upstream of suction throttles 25, 25', and optionally merge again upstream of low pressure pumps 11, 11' into the flow path for the fuel again, in particular into the fluidic connection between pre-filter 9 and low pressure pumps 11, 11'.

To each high pressure pump 15, 15' is also assigned a lubrication path 33, 33', which serves the lubrication of respective high pressure pump 15, 15' with fuel as the lubricant. Lubrication path 33, 33' respectively branches off downstream of primary filter 13, in particular upstream of suction throttle 25, 25', from the fluidic connection between primary filter 13 and high pressure pumps 15, 15' and feeds in each case into at least one lubrication point of the assigned high pressure pump 15, 15'.

To high pressure pumps 15, 15' is also optionally assigned a leakage path 35, or a plurality of such leakage paths 35, wherein the at least one leakage path 35 is designed to guide fuel used as a lubricant from high pressure pumps 15, 15' back into fuel tank 7. In particular, to each high pressure pump 15, 15' is optionally assigned such a leakage path 35, or a common leakage path 35.

Control unit 21 is optionally designed to monitor—in particular additionally—low pressure pumps 11, 11', control valves 29, 29', suction throttles 25, 25' and/or high-pressure pumps 15, 15', in particular the lubrication thereof, for an error state on the basis of the first pressure value and the second pressure valve.

Figure 2:
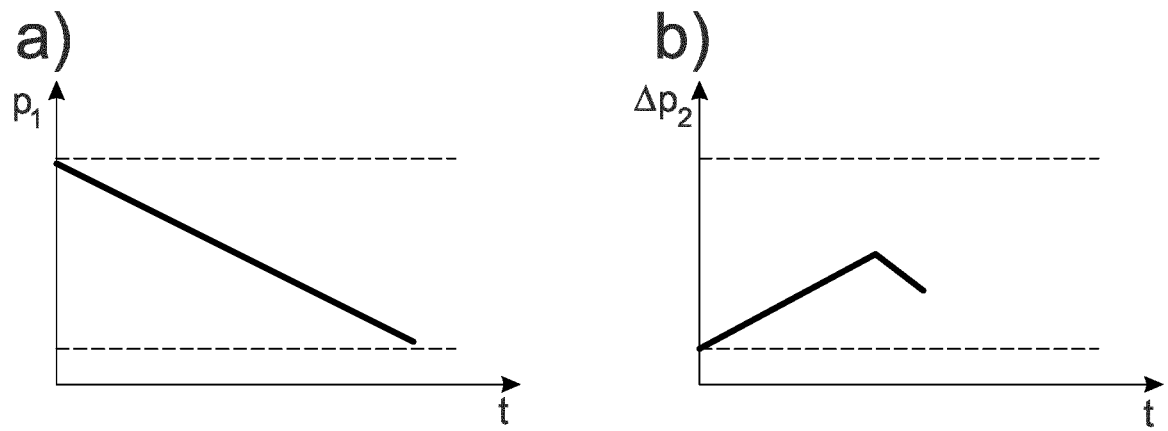
FIG. 2 is a first schematic representation of the mode of operation of one embodiment of a method for monitoring a fuel supply system of an internal combustion engine.

FIG. 2 shows a first schematic representation of the functioning of an embodiment of a method for monitoring fuel supply system 3.

In a) a first pressure value, in this case a pressure curve $p_1$ detected by first pressure sensor 17, is plotted against time t. In b) a second pressure value is plotted against time t as the differential pressure value Δp₂ dropping above primary filter 13, which is detected by second pressure sensors 19.1, 19.2.

The first pressure value shows the normal pressure curve $p_1$ for aging of pre-filter 9, wherein the pressure detected downstream of pre-filter 9 decreases with time t, because pre-filter 9 becomes clogs. Accordingly, with increasing aging, less fuel per unit of time can pass through pre-filter 9. Diagram b) indicates a breakdown of primary filter 13. Differential pressure $\Delta p_2$ falling above primary filter 13 initially increases, as expected with normal aging of primary filter 13, but then suddenly drops, subsequent to the filter breakdown over time t. Since this error state in the form of the filter breakdown is only detected on one of the filters, in this case primary filter 13, and not on the other filter, namely pre-filter 9, control unit 21 correctly detects an error state, namely a filter breakdown of primary filter 13.

Control unit 21 is designed in particular to detect a filter breakdown of a certain filter, selected from pre-filter 9 and primary 13, if only the pressure value assigned to the specific filter 9, 13 indicates the filter breakdown.

Figure 3:
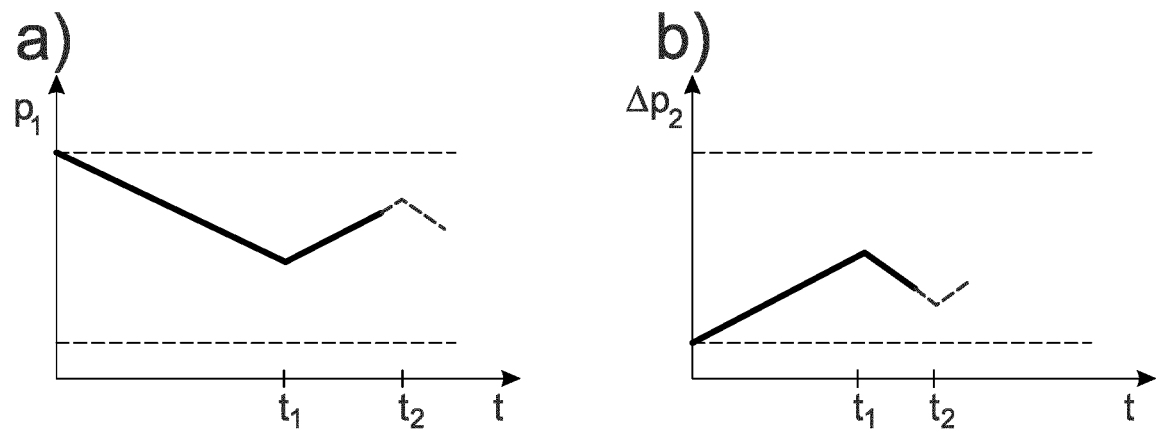
FIG. 3 is a second schematic representation of the embodiment of the method.

FIG. 3 shows a second schematic representation of the embodiment of the method. The diagrams are identical to the diagrams of FIG. 2 with regard to the plotted values, so that reference is made to the previous description.

Here, however, an event can be seen in both pressure values over time, which could basically suggest a filter breakdown, namely a corresponding kink, as above in FIG. 2b). In the case of pre-filter 9, pressure $p_1$ rises again after the presumed filter breakdown, which would also be the case with an actually existing filter breakdown, since then more fuel per unit of time flows through pre-filter 9. However, since the corresponding filter breakdown is recorded in particular at the same time $t_1$, or only with a slight time delay within a predetermined tolerance-time interval, it seems more likely that there is a common cause for the observed phenomenon, whereby it seems implausible that both filters, namely pre-filter 9 and primary 13, suffer a filter breakdown at almost the same time. A situation as shown in diagrams a) and b) of FIG. 3 can occur, for example, if the viscosity of fuel 3 changes, especially if the viscosity of the fuel decreases. Along the same lines, such a situation can also occur when the temperature of the fuel increases. The situation shown in FIG. 3 thus suggests a fuel change rather than an error state of the filters. Likewise, it can be used for plausibility checking that at a later point in time $t_2$ the curve changes again, in other words, the kink reverses again, since the viscosity has now adjusted to a certain value, but now again the mechanisms of pollution or aging take effect. In particular, it may therefore be provided that if at least one of the pressure values, selected from the first pressure value and the second pressure value, indicates an error state in the fuel supply system 3, the error state is checked for plausibility on the basis of a further chronological development of at least one pressure value.

Control unit 21 is therefore optionally designed to not detect a filter breakdown if the first pressure value and the second pressure value both indicate a filter breakdown.

It becomes clear that the herein proposed plausibility check of an error state based on both pressure values enables in particular a reduction of the problem of false-positive error detections.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for monitoring a fuel supply system in an internal combustion engine, the method comprising the steps of:
   recording a first pressure value in the fuel supply system in a region of the fuel supply system associated with a pre-filter and upstream of a low pressure pump;
   recording a second pressure value in the fuel supply system downstream of the low pressure pump in a region of the fuel supply system associated with a primary filter;
   monitoring the first pressure value and the second pressure value for an error state of the fuel supply system; and
   recognizing the error state only if the error state is plausible on a basis of both the first pressure value and the second pressure value.

2. The method according to claim 1, wherein, if one of the first pressure value and the second pressure value indicates the error state in the fuel supply system, the error state is verified on a basis of the other one of the first pressure value and the second pressure value, wherein the error state is accepted only if a verification returns a positive result.

3. The method according to claim 1, wherein the error state is detected only if the error state can be clearly assigned to one of the first pressure value and the second pressure value.

4. The method according to claim 1, wherein as the first pressure value and as the second pressure value respectively, a chronological pressure value progression is recorded, wherein the chronological pressure value progression is monitored for changes.

5. The method according to claim 1, wherein for the first pressure value a local pressure is detected, wherein the second pressure value is detected as differential pressure.

6. The method according to claim 1, wherein at least one of:
   a) a fuel temperature value is detected, wherein the error state is recognized only if the error state is also plausible on a basis of the fuel temperature value; and
   b) a load point of the internal combustion engine is detected, wherein the error state is detected only if the error state is also plausible on a basis of the load point of the internal combustion engine that is detected.

7. The method according to claim 1, wherein if at least one of the first pressure value and the second pressure value indicates the error state in the fuel supply system, the error state is checked for plausibility on a basis of a further chronological development of at least one of the first pressure value and the second pressure value.

8. The method according to claim 1, wherein on a basis of the first pressure value and the second pressure value, the pre-filter and the primary filter are monitored for the error state.

9. The method according to claim 1, wherein a filter breakdown at one of the pre-filter and the primary filter is detected if only a pressure value assigned to a respective one of the pre-filter and the primary filter suggests the filter breakdown, wherein the filter breakdown is not detected if the first pressure value and the second pressure value indicate the filter breakdown.

10. The method according to claim 1, wherein the fuel supply system is used to supply a plurality of the internal combustion engine, wherein the error state is checked for plausibility via at least two of the internal combustion engine of the plurality of the internal combustion engine.

11. The method according to claim 1, wherein at least one further component is monitored for a filter state on a basis of the first pressure value and the second pressure value, wherein the further component is selected from a group consisting of: the low pressure pump, a control valve, a suction throttle, and a high pressure pump.

12. An internal combustion engine, comprising:
a fuel supply system configured for feeding a fuel to at least one combustion chamber of the internal combustion engine, the fuel supply system including a storage tank, a pre-filter, a low pressure pump, a high pressure pump, a primary filter, a first pressure measuring device, and a second pressure measuring device, the storage tank being fluidically connected via the pre-filter to the low pressure pump, the low pressure pump being fluidically connected to the high pressure pump via the primary filter, the first pressure measuring device being configured to detect a first pressure value in the fuel supply system in a region of the fuel supply system associated with the pre-filter and upstream of the low pressure pump, the second pressure measuring device being configured to detect a second pressure value in the fuel supply system downstream of the low pressure pump in a region of the fuel supply system associated with the primary filter; and
a control unit which is operatively connected with the first pressure measuring device and with the second pressure measuring device and is equipped to monitor the first pressure value and the second pressure value for an error state of the fuel supply system and to detect the error state only if the error state is plausible based on the first pressure value and on the second pressure value.

13. The internal combustion engine of claim 12, wherein the control unit is configured for carrying out a method for monitoring the fuel supply system in the internal combustion engine, the method including the steps of:
recording the first pressure value in the fuel supply system in the region of the fuel supply system associated with the pre-filter and upstream of the low pressure pump;
recording the second pressure value in the fuel supply system downstream of the low pressure pump in the region of the fuel supply system associated with the primary filter;
monitoring the first pressure value and the second pressure value for the error state of the fuel supply system; and
recognizing the error state only if the error state is plausible on a basis of both the first pressure value and the second pressure value.

\* \* \* \* \*